3,003,002
PURIFICATION OF ETHER

Robert N. Feinstein, Downers Grove, Ill., assignor to the United States of America as represented by the United States Atomic Energy Commission
No Drawing. Filed Jan. 8, 1959, Ser. No. 785,763
5 Claims. (Cl. 260—616)

This invention deals with a process of purifying ethers from peroxides formed during storage, and it also deals with the recovery of such peroxides.

Ether, when stored for a great period of time, and in particular when exposed to light, decomposes and forms peroxide. This content of peroxide has distinct disadvantages; in the first place, it represents an explosion hazard and, furthermore, it is an impurity. When ether is stored with the usual precaution, that is, in opaque containers and away from light, the peroxide forms at a greatly reduced speed; however, there still is a certain amount of decomposition taking place.

Heretofore this drawback has been overcome by the addition of water and a reducing agent, for instance an ethanol solution, to the ether and subjecting the mixture to a distillation process immediately before use; pure ether was then volatilized while the peroxide remained in a higher-boiling residue. In order to avoid too high a peroxide concentration and consequent explosion, however, the peroxide could not be allowed to become too concentrated, in other words a high quantity of ether has to be left in the residue. This made the process uneconomical.

It is an object of this invention to provide a process for the removal of peroxides from ethers in which the loss of ether is negligible.

It is another object of this invention to provide a process for the removal of peroxides from ethers which is fast and simple.

It is still another object of this invention to provide a process for the removal of peroxides from ethers which does not require a distillation apparatus.

It is finally also an object of this invention to provide a process for the removal of peroxides from ethers in which the peroxide can be easily recovered if so desired.

These objects are accomplished by contacting the peroxide-contaminated ether with a strong-base anion exchange resin in its hydroxyl form whereby the peroxide is preferentially adsorbed on said resin while the ether remains substantially unadsorbed.

All strong-base anion exchange resins are suitable for the process of this invention. The resin prepared by the process disclosed in Example II of U.S. Patent No. 2,614,099, granted to William C. Bauman, yielded the very best results; this resin is a quaternary ammonium salt of the formula $RR'R'R'N^+A^-$, in which R is derived from polystyrene which in turn has been cross-linked with divinylbenzene for maximum exchange capacity and R' is a methyl group. Another anion exchange resin that proved suitable, although inferior to the one just mentioned, is the quaternary ammonium salt of the formula $RR'R'R''N^+A^-$, in which again R is derived from polystyrene that has been cross-linked with divinylbenzene for maximum exchange capacity, R' is a methyl group and R'' is a hydroxyethyl group; this resin is prepared according to Example IV of U.S. Patent No. 2,614,099.

As has been mentioned, the anion exchange resin has to be in the hydroxyl form for the process of this invention. The resin can be converted to the hydroxyl form by contacting it with any water-soluble hydroxide, such as sodium hydroxide, potassium hydroxide and ammonium hydroxide.

The process of this invention is primarily intended for the treatment of diethyl ether; however, it also is applicable to other peroxide-containing ethers.

The capacity of the anion exchange resin for the peroxide varies slightly with the type of peroxide, its concentration, with the temperature of the ether, etc. For one gram of the resin of the formula $RR'R'R'N^+A^-$, which had acquired a moisture content of about 50% during storage, the capacity for diethyl peroxide was found to be approximately 0.17 milliequivalent.

The peroxide content of the ether depends on storage conditions, in particular amount of light to which it is exposed and duration of storage. Under the least favorable storage conditions, that is when the ether was stored in a transparent glass flask and exposed to daylight, about 0.5 milliequivalent of peroxide was formed in one liter of diethyl ether per day. In this case the use of three grams of resin per liter of ether per day of storage sufficed for the removal of the peroxide; this is several hundredfold the quantity that is required for average storage in opaque containers away from sunlight.

Contact of the resin with the ether can either be carried out in a continuous method, for instance by having the resin in columns and flowing the ether therethrough, or in a batchwise operation. The peroxide can also be removed in situ while it is formed by adding the resin to the ether in the storage container.

If desired, the peroxide, which is useful in organic chemistry, for instance as a catalyst in the plastic industry, can be recovered by eluting it from the resin. Suitable eluants were found to be water-soluble hydroxides, chloride-anions-containing solutions and phosphoric-acid-anions-containing solutions. A concentration of from 0.1 to 10 M of these substances in the eluant solution is operative. Acid eluants are superior to neutral or alkaline solutions, and the best results were obtained with a potassium dihydrogen phosphate-orthophosphoric acid mixture which has a phosphate anion concentration of about 0.1 M and a pH value of about 2. In passing the eluant through the resin contained, for instance, in the column, the hydroxyl anion comes off first, then a very distinct and concentrated fraction contains the peroxide, and finally the effluent consists of pure eluant. The peroxide can be recovered from the intermediate effluent fraction by means known to those skilled in the art.

In the following, two examples are given to illustrate the process of this invention but not to limit its scope to the details given therein.

Example I

A column that had an inner diameter of 10 mm. and the bottom of which was plugged with glass wool and a circular piece of filter paper thereabove was used; four grams of resin in its hydroxyl form prepared according to Example II of U.S. Patent No. 2,614,099 were placed into the column. A diethyl ether was used for this example which showed a strong peroxide reaction when it was shaken with a fresh 10% potassium iodide solution (10 ml. of ether, 1 ml. of potassium iodide solution) according to the specifications of the American Chemical Society, 1955. Both phases, the aqueous and the organic, obtained thereby showed a strong yellow color which indicated a comparatively high peroxide content.

About 20 ml. of the same peroxide-containing ether were then passed through the resin column. Water came off first. After practically all of the water had been removed, the effluent consisted predominantly of ether; this ether fraction was collected and tested for peroxide by the above-described potassium iodide method. There was no color in either the organic or the aqueous phase, which indicated that all of the peroxide had been adsorbed on the resin.

The resin column was then treated with an aqueous solution of a potassium dihydrogen phosphate-orthophosphoric acid solution in which the phosphate anion concentration was 0.1 M and the pH was 2.1. Ten-ml. fractions of the phosphate solution were passed through the column and the corresponding 10-ml. effluents were collected separately and individually tested for peroxide. The "breakthrough" point was clearly indicated by the color change of the resin to a more bleached appearance, which occurred when the hydroxyl-form resin was converted to the phosphate form. The fraction at the breakthrough point, upon testing, showed a strong peroxide reaction, while the effluent fractions preceding and succeeding this "breakthrough fraction" contained very little peroxide. When the same type of resin that had not been contacted with ether was eluted with the phosphate solution, the peroxide tests were negative.

The following example shows the beneficial effect of contact with the resin during storage of ether on reducing the peroxide content.

*Example II*

Diethyl ether was freed of peroxides by passing it through a column containing the same type of resin as used in Example I. Two 250-ml. portions of this purified ether each were charged in a transparent glass bottle; to one bottle 10 grams of resin were added, while the other one was stored without resin and served as a control test. Both bottles were placed in the path of direct sunlight so that they were receiving the same amount of light. At intervals the bottles were carefully opened without shaking them, and 25-ml. aliquots were removed by a rubber-bulbed pipette and tested for peroxide. After seven days the bottles were inverted twice and, after settling, ether was again withdrawn and tested for peroxide. The table below shows the results of these tests.

| Time of standing in sunlight, days | Millequivalents peroxide per liter of ether | | Reduction of peroxide content due to resin, percent |
|---|---|---|---|
| | Without resin | With resin | |
| Initial | 0.00 | 0.00 | |
| 1 | 0.43 | 0.06 | 86 |
| 2 | 0.54 | 0.10 | 81 |
| 4 | 1.32 | 0.12 | 91 |
| 7 | 2.70 | 0.13 | 95 |
| 7 (after inverting) | 2.69 | 0.05 | 98 |

The above data clearly indicate that, by storing ether while in contact with a strong-base anion exchange resin, peroxide either is not formed or is removed as it is formed; the use of the ether thus treated does not involve any explosion hazard. The different rate of peroxide formation from day to day in the above experiments was probably due to varied amounts of light which the samples received due to varying weather conditions.

It will be understood that this invention is not to be limited to the details given herein but that it may be modified within the scope of the appended claims.

What is claimed is:

1. A process of removing peroxides from a peroxide-containing ether, comprising contacting said ether with a strong-base anion exchange resin in its hydroxyl form whereby the peroxides are preferentially adsorbed on said resin while the ether remains substantially unadsorbed, and separating said resin from said ether.

2. A process of removing peroxides from a peroxide-containing ether, comprising contacting a water-soluble hydroxide solution with a strong-base anion exchange resin whereby it is converted to the hydroxyl form; then contacting the resin with peroxide-contaminated ether whereby the peroxide is preferentially adsorbed on said resin while the ether remains substantially unadsorbed; and separating said resin from said ether.

3. The process of claim 1 wherein the ether is diethyl ether.

4. A process of removing peroxide from diethyl ether as it is formed during storage, comprising adding a strong-base anion exchange resin to said ether during storage whereby any peroxide formed is adsorbed on said resin, and separating said resin from said ether.

5. A process of removing peroxides from a peroxide-containing dialkyl ether comprising contacting a strong-base anion exchange resin with a water-soluble hydroxide whereby the resin is converted to the hydroxyl form, contacting said ether with said resin whereby the peroxide is preferentially adsorbed on said resin while said ether remains substantially unadsorbed, and separating said resin from said ether.

References Cited in the file of this patent

UNITED STATES PATENTS

| 2,130,079 | Evans | Sept. 13, 1938 |
| 2,132,018 | Evans | Oct. 4, 1938 |
| 2,706,189 | Pruitt et al. | Apr. 12, 1955 |
| 2,736,709 | Glickman et al. | Feb. 28, 1956 |
| 2,915,557 | Kreps et al. | Dec. 1, 1959 |
| 2,915,558 | Alders et al. | Dec. 1, 1959 |
| 2,938,058 | Tinsley et al. | May 24, 1960 |
| 2,942,033 | Leis et al. | June 21, 1960 |

OTHER REFERENCES

Stamicarbon, Chemical Abstracts, vol. 49 (1955), page 5899.